United States Patent
Gregg et al.

(10) Patent No.: US 10,138,873 B2
(45) Date of Patent: Nov. 27, 2018

(54) SYSTEMS AND METHODS FOR WIND TURBINE NACELLE-POSITION RECALIBRATION AND WIND DIRECTION ESTIMATION

(71) Applicant: General Electric Company, Schenectady, NY (US)

(72) Inventors: Peter Alan Gregg, Niskayuna, NY (US); Megan Michela Wilson, Greenville, SC (US); Siddhanth Chandrashekar, Karnataka (IN); Vineel Chandrakanth Gujjar, Karnataka (IN); Manisha Srivastava, Austin, TX (US); Colin Craig McCulloch, Half Moon Bay, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 617 days.

(21) Appl. No.: 14/291,140

(22) Filed: May 30, 2014

(65) Prior Publication Data
US 2015/0345476 A1    Dec. 3, 2015

(51) Int. Cl.
*G01C 17/38*    (2006.01)
*F03D 11/00*    (2006.01)
(Continued)

(52) U.S. Cl.
CPC .......... *F03D 11/0091* (2013.01); *F03D 7/048* (2013.01); *F03D 17/00* (2016.05); *F05B 2270/802* (2013.01); *Y02E 10/723* (2013.01)

(58) Field of Classification Search
CPC ....... F03D 17/00; F03D 7/048; Y02E 10/723; G05B 2219/32057
(Continued)

(56) References Cited

U.S. PATENT DOCUMENTS 5,838,007 A * 11/1998 Wang ..................... G01N 21/41
250/338.5
6,993,965 B2    2/2006 Yoshida
(Continued)

FOREIGN PATENT DOCUMENTS

EP    2631471 A1    8/2013
GB    2477968 A    8/2011
(Continued)

OTHER PUBLICATIONS

Sargolzaei, J., "Prediction of the power ratio and torque in wind turbine Savonius rotors using artificial neural networks." Proceedings of the WSEAS International Conference on Renewable Energy Sources, Arcachon, France, Oct. 14-16, 2007.*
(Continued)

*Primary Examiner* — An Do
(74) *Attorney, Agent, or Firm* — GE Global Patent Operation; Nitin Joshi

(57) ABSTRACT

A computer-implemented method for recalibrating nacelle-positions of a plurality of wind turbines in a wind park is implemented by a nacelle calibration computing device including a processor and a memory device coupled to the processor. The method includes identifying at least two associated wind turbines included within the wind park wherein each associated wind turbine includes location information, determining a plurality of predicted wake features for the associated wind turbines based at least partially on the location information of each associated wind turbine, retrieving a plurality of historical performance data related to the associated wind turbines, determining a plurality of current wake features based on the plurality of historical performance data, identifying a variance between the predicted wake features and the current wake features, and
(Continued)

determining a recalibration factor for at least one of the associated wind turbines based on the identified variance.

6 Claims, 11 Drawing Sheets

(51) Int. Cl.
      *F03D 7/04*       (2006.01)
      *F03D 17/00*      (2016.01)
(58) Field of Classification Search
     USPC .............................................. 702/85, 92–96
     See application file for complete search history.

(56) References Cited

U.S. PATENT DOCUMENTS

| | | | |
|---|---|---|---|
| 7,347,668 B2 | 3/2008 | Pedersen et al. | |
| 7,550,862 B2 | 6/2009 | Altemark | |
| 7,941,304 B2 | 5/2011 | Gundling | |
| 8,035,241 B2 | 10/2011 | Subramanian et al. | |
| 8,141,416 B2* | 3/2012 | Gujjar | G06Q 10/00 290/44 |
| 8,267,655 B2* | 9/2012 | Loh | F03D 7/042 416/1 |
| 8,476,780 B2 | 7/2013 | Hashimoto et al. | |
| 9,617,975 B2* | 4/2017 | Attia | F03D 17/00 |
| 2002/0194113 A1* | 12/2002 | Lof | G01W 1/10 705/37 |
| 2007/0124025 A1 | 5/2007 | Schram et al. | |
| 2011/0074155 A1* | 3/2011 | Scholte-Wassink | E02D 27/50 290/44 |
| 2011/0125419 A1* | 5/2011 | Bechhoefer | F03D 7/047 702/34 |
| 2012/0053983 A1* | 3/2012 | Vittal | G06Q 10/06 705/7.28 |
| 2012/0169053 A1* | 7/2012 | Tchoryk, Jr. | G01P 5/26 290/44 |
| 2012/0263592 A1 | 10/2012 | Lind | |
| 2013/0166082 A1 | 6/2013 | Ambekar et al. | |
| 2013/0300115 A1 | 11/2013 | Seem et al. | |
| 2013/0320676 A1 | 12/2013 | Kim et al. | |
| 2014/0003939 A1* | 1/2014 | Adams | F03D 7/0224 416/1 |
| 2014/0028495 A1 | 1/2014 | Schroeder et al. | |
| 2014/0028496 A1 | 1/2014 | Schroeder et al. | |
| 2014/0037447 A1* | 2/2014 | Attia | F03D 17/00 416/1 |
| 2014/0271181 A1* | 9/2014 | Perley | F03D 7/042 416/1 |
| 2015/0345467 A1* | 12/2015 | Kramer | F03D 17/00 415/1 |

FOREIGN PATENT DOCUMENTS

| | | |
|---|---|---|
| WO | 2013020289 A1 | 2/2013 |
| WO | 2013110327 A1 | 8/2013 |

OTHER PUBLICATIONS

Koch F et al.,"Consideration of wind farm wake effect in power system dynamic simulation", Power Tech, IEEEXplore, Jun. 27-30, 2005, pp. 1-7, Conference Location : St. Petersburg.

Muhammad et al.,"Effect of wake consideration on estimated costs of wind energy curtailments", 8th International Workshop on Large Scale Integration of Wind Power into Power Systems as well as on Transmission Networks of Offshore Wind Farms, KTH publication database DiVA, 2009.

Ambekar et al., "Systems and Methods for Optimizing Operation of a Wind Farm," Filed in India on Apr. 29, 2014, SN: 2155/CHE/2014, pp. 1-43.

Ambekar et al., "System and Method for Controlling a Wind Farm" Filed in India on Apr. 29, 2014, SN: 2156/CHE/2014, pp. 1-33.

European Search Report and Opinion issued in connection with corresponding EP Application No. 15169733.1 dated Oct. 7, 2015.

* cited by examiner

SYSTEMS AND METHODS FOR WIND TURBINE NACELLE-POSITION RECALIBRATION AND WIND DIRECTION ESTIMATION

BACKGROUND

The field of the disclosure relates generally to wind turbines, and more particularly, to methods and systems for nacelle-position calibration in wind parks.

In many known wind parks, wind direction is an important measurement value. In at least some known wind parks, wind direction may be determined based upon a number called nacelle-position. Nacelle-position is initially set at the time of commissioning of a wind turbine. However, some known wind turbines may deviate in orientation from the initial calibrated nacelle-position.

In order to effectively utilize nacelle-position as a proxy value to determine wind direction, effective methods of recalibrating nacelle-position may be required.

BRIEF DESCRIPTION

In one aspect, a computer-implemented method for recalibrating nacelle-positions of a plurality of wind turbines in a wind park is provided. The method is implemented by a nacelle calibration computing device including a processor and a memory device coupled to the processor. The method includes identifying at least two associated wind turbines included within the wind park wherein each associated wind turbine includes location information, determining a plurality of predicted wake features for the associated wind turbines based at least partially on the location information of each associated wind turbine, retrieving a plurality of historical performance data related to the associated wind turbines, determining a plurality of current wake features based on the plurality of historical performance data, identifying a variance between the predicted wake features and the current wake features, and determining a recalibration factor for at least one of the associated wind turbines based on the identified variance.

In a further aspect, a nacelle calibration computing device for recalibrating nacelle-positions of a plurality of wind turbines in a wind park is provided. The nacelle calibration computing device includes a processor and a memory coupled to the processor. The processor is configured to identify at least two associated wind turbines included within the wind park wherein each associated wind turbine includes location information, determine a plurality of predicted wake features for the associated wind turbines based at least partially on the location information of each associated wind turbine, retrieve a plurality of historical performance data related to the associated wind turbines, determine a plurality of current wake features based on the plurality of historical performance data, identify a variance between the predicted wake features and the current wake features, and determine a recalibration factor for at least one of the associated wind turbines based on the identified variance.

In another aspect, a computer-implemented method for recalibrating nacelle-positions of a plurality of wind turbines in a wind park wherein each wind turbine is in a spatial relationship with at least one plurality of neighboring wind turbines is provided. The method is implemented by a nacelle calibration computing device including a processor and a memory device coupled to the processor. The method includes identifying a first wind turbine of the plurality of wind turbines wherein the first wind turbine is in a first spatial relationship with a first plurality of neighboring wind turbines included within the wind park, identifying a second wind turbine of the plurality of wind turbines as a paired wind turbine associated with the first wind turbine wherein the second wind turbine is included within the first plurality of neighboring wind turbines, retrieving a first plurality of historical performance data related to the first wind turbine and a second plurality of historical performance data related to the second wind turbine, determining a first plurality of wake features for the first wind turbine and the second wind turbine based at least partially on the first plurality of historical performance data and the second plurality of historical performance data, determining whether the first plurality of wake features is less than a wake feature threshold, and identifying a third wind turbine, included within the first plurality of neighboring wind turbines, to replace the second wind turbine as the paired wind turbine associated with the first wind turbine upon determining that the first plurality of wake features is less than the wake feature threshold.

DRAWINGS

These and other features, aspects, and advantages will become better understood when the following detailed description is read with reference to the accompanying drawings in which like characters represent like parts throughout the drawings, wherein.

Figure 1:
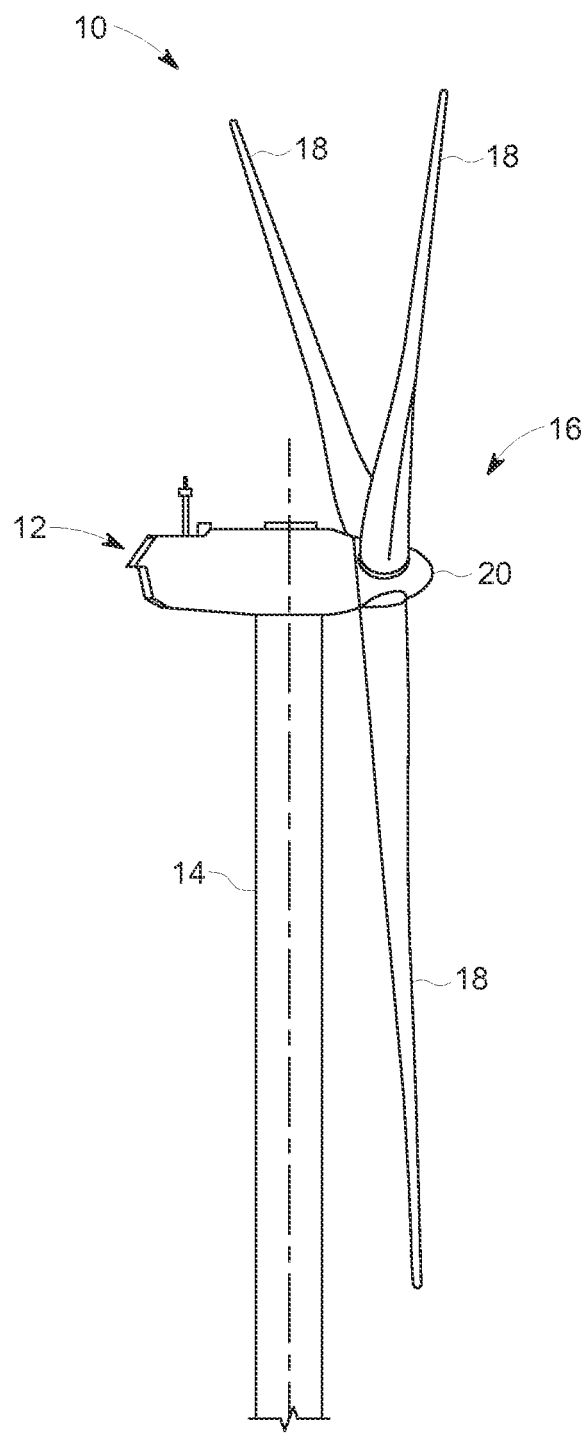
FIG. 1 is a schematic view of an exemplary wind turbine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "wake effects" refers to a change in the flow of wind or air due to the wind or air flowing past a wind turbine. More specifically, when wind blows across a plurality of wind turbines that are oriented in the same direction and on an axis parallel to the direction of the wind, wake effects result in decreased wind to downstream wind turbines.

As used herein, the term "wake feature" refers to characteristics of production data for wind turbines that are upstream or downstream from one another indicating that one turbine is causing wake effects on the other turbines. For example, a spike (e.g., a peak or a trough in a power ratio) in a production output ratio between turbines may be a wake feature.

Computer systems, such as the nacelle calibration computing device are described, and such computer systems include a processor and a memory. However, any processor in a computer device referred to herein may also refer to one or more processors wherein the processor may be in one computing device or a plurality of computing devices acting in parallel. Additionally, any memory in a computer device referred to may also refer to one or more memories, wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor." The term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above are only examples, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an exemplary embodiment, the system is executed on a single computer system, without requiring a connection to a server computer. In a further embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The computer-implemented systems and methods described herein provide an efficient approach for recalibrating nacelle-positions of a plurality of wind turbines in a wind park. More specifically, the systems and methods are configured to (a) identify at least two associated wind turbines included within the wind park, wherein each associated wind turbine includes location information, (b) determine a plurality of predicted wake features for the associated wind turbines based at least partially on the location information of each associated wind turbine, (c) retrieve a plurality of historical performance data related to the associated wind turbines, (d) determine a plurality of current wake features based on the plurality of historical performance data, (e) identify a variance between the predicted wake features and the current wake features, and (f) determine a recalibration factor for at least one of the associated wind turbines based on the identified variance.

Upon determining recalibration factors, such recalibration factors may be used for recalibration of nacelle-positions in a variety of manners. In one example, the recalibration factor may be used to physically adjust the actual reading of the nacelle-position at the turbine level. In a second example, the recalibration factor may be used at the monitoring/reporting level such that reported nacelle-positions for the wind turbine are adjusted upon receipt. In a third example, the recalibration factor may be used as a "back end" recalibration tool used to adjust existing data sets during a post-processing phase.

The computer-implemented systems and methods described herein also provide an efficient alternative approach for recalibrating nacelle-positions of a plurality of wind turbines in a wind park by identifying appropriate wind turbine pairs. More specifically, the systems and methods are configured to (a) identify a first wind turbine of the plurality of wind turbines, wherein the first wind turbine is in a first spatial relationship with a first plurality of neighboring wind turbines included within the wind park, (b) identify a second wind turbine of the plurality of wind turbines as a paired wind turbine associated with the first wind turbine, wherein the second wind turbine is included within the first plurality of neighboring wind turbines, (c) retrieve a first plurality of historical performance data related to the first wind turbine and a second plurality of historical performance data related to the second wind turbine, (d) determine a first plurality of wake features for the first wind turbine and the second wind turbine based at least partially on the first plurality of historical performance data and the second plurality of historical performance data, (e) determine whether the plurality of wake features is less than a wake feature threshold, and (f) identify a third wind turbine, included within the first plurality of neighboring wind turbines, to replace the second wind turbine as the paired wind turbine associated with the first wind turbine upon determining that the first plurality of wake features is less than the wake feature threshold.

FIG. 1 is a schematic view of an exemplary wind turbine 10. Wind turbine 10 is an electric power generation device including a nacelle 12 housing a generator (not shown in FIG. 1). Nacelle 12 is mounted on a tower 14 (a portion of tower 14 being shown in FIG. 1). Tower 14 may be any height that facilitates operation of wind turbine 10 as described herein. Wind turbine 10 also includes a rotor 16 that includes three rotor blades 18 attached to a rotating hub 20. Alternatively, wind turbine 10 includes any number of blades 18 that facilitates operation of wind turbine 10 as described herein. In the exemplary embodiment, wind turbine 10 includes a gearbox (not shown in FIG. 1) rotatably coupled to rotor 16 and the generator.

In the exemplary embodiment, nacelle 12 is associated with a nacelle-position value representing the orientation of nacelle 12. Nacelle-position is generally determined at the time of commission of wind turbine 10. Nacelle-position value is made available to computing devices (not shown in FIG. 1) such as those described herein. Accordingly, in many known wind parks, a computing device monitoring the wind park may have a record for nacelle-positions of wind turbines 10. In some examples, 'yaw position' may be used interchangeably with 'nacelle-position'. As used herein, 'nacelle-position' may alternately be referred to as 'yaw position'.

Nacelle-position provides an orientation for nacelle 12 and therefore indicates the direction of the wind. As described herein, many known wind parks do not have sufficient meteorological tools, such as wind vanes mounted on meteorological masts ("metmasts") or wind turbine nacelles, to determine wind direction. However, wind direction may be inferred based on nacelle-position. In one example, wind turbine 10 may be assumed to have nacelle 12 facing eastward, and it may therefore be inferred that the direction of the wind is westward However, as discussed above, in some situations nacelle-position may become unreliable and may not reflect the actual orientation of nacelle 12. For example, maintenance and repair of wind turbine 10 or software associated with wind turbine 10 may cause improper adjustment of nacelle-position.

Figure 2:
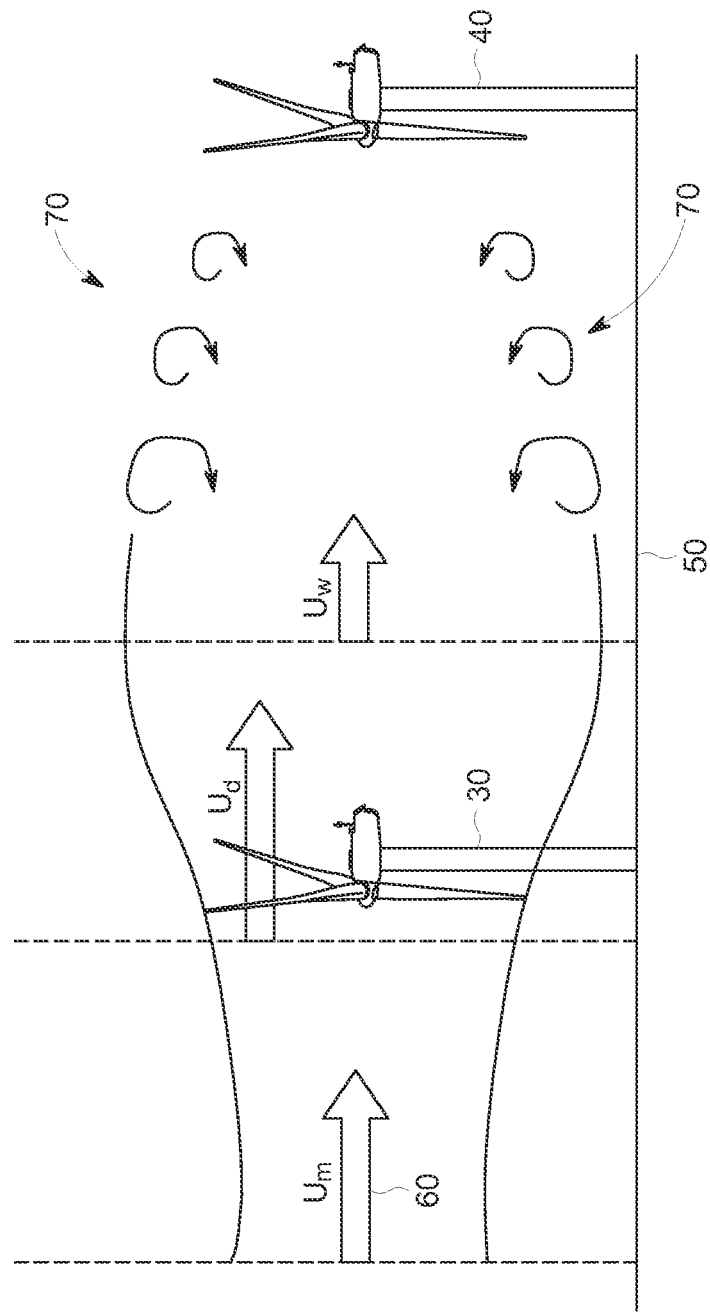
FIG. 2 is a schematic view of a pair of wind turbines such as the wind turbine of FIG. 1 wherein the pair of wind turbines are in an axial spatial relationship with one another and the first wind turbine causes wake effects for the second wind turbine.

FIG. 2 is a schematic view of a pair of wind turbines 30 and 40 such as wind turbine 10 (shown in FIG. 1) wherein pair of wind turbines 30 and 40 are in an axial spatial relationship along axis 50 and wherein first wind turbine 30 causes wake effects for second wind turbine 40 when wind flows from left to right (representing west to east) as indicated by wind direction 60. Accordingly, wind flows in wind direction 60 along axis 50 and first passes wind turbine 30 and then wind turbine 40. Accordingly, wind turbine 30 may be designated as upstream wind turbine 30 and wind turbine 40 may be designated as downstream wind turbine 40. When wind passes upstream wind turbine 30, energy is extracted from the wind by upstream wind turbine 30 and the wind experiences a velocity deficit downstream of upstream wind turbine 30. More specifically, the flow of wind past upstream wind turbine 30 causes wake effects 70. Accordingly, wind flow experienced by downstream wind turbine 40 is substantially altered by wake effects 70. Functionally, depending upon factors such as the proximity between wind turbines 30 and 40, the strength and orientation of the wind, and intervening objects, the wind flow experienced by downstream wind turbine 40 may vary significantly from the wind flow experienced by upstream wind turbine 30 due to wake effects 70.

As a result, when wind blows along wind direction 60, it is anticipated that downstream wind turbine 40 may produce significantly less power than upstream wind turbine 30 due to wake effects 70. In at least some examples, a predicted ratio of power output for wind turbines 30 and 40 may be determined based upon factors such as distance between wind turbines 30 and 40, the strength and orientation of the wind, and intervening objects. As described herein, performance data may be compared to prediction data based on models associated with wind turbines 30 and 40. Such comparisons may be used to identify whether nacelle-position is properly calibrated for wind turbines 30 and 40.

Figure 3:
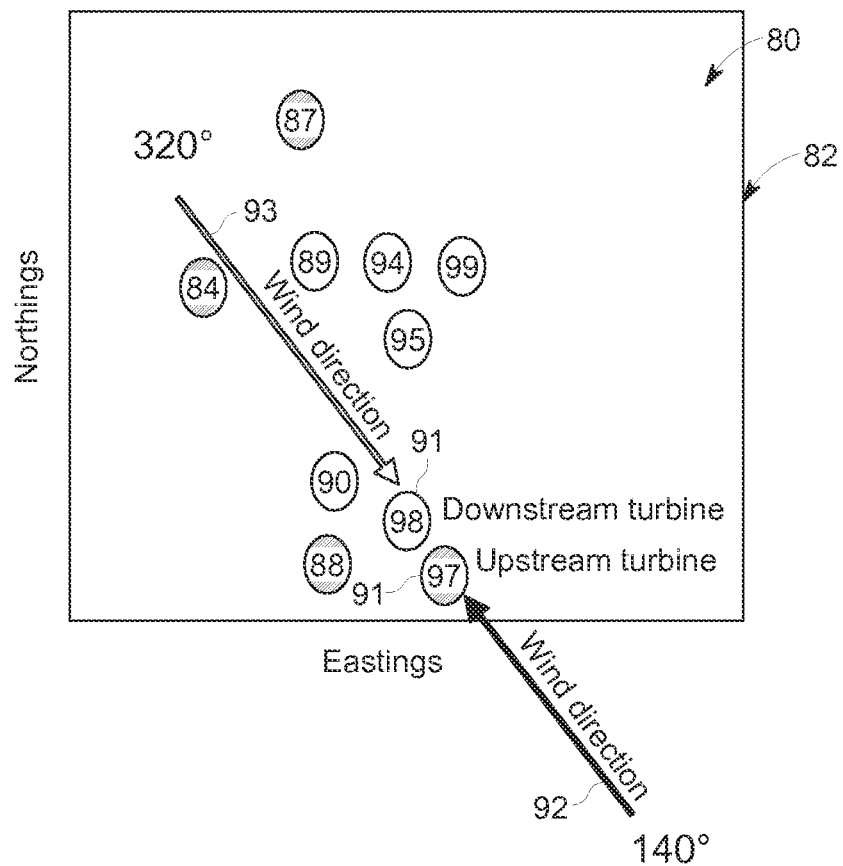
FIG. 3 is plot of a plurality of wind turbines in a wind park wherein the wind turbines create wake effects for other wind turbines.

FIG. 3 is plot of a plurality of wind turbines 80 in wind park 82 wherein wind turbines 80 create wake effects such as wake effects 70 (shown in FIG. 2) for other wind turbines. Wind turbines 80 are substantially consistent in description with wind turbine 10 (shown in FIG. 1). As indicated in FIG. 3, plurality of wind turbines 80 includes wind turbines 84, 87, 88, 89, 90, 94, 95, 97, 98, and 99. Each wind turbine 80 is oriented in a particular direction (with particular actual nacelle-positions) and is thus capable of generating optimal power when wind is in alignment with that particular direction. Nacelle-positions for wind turbines 84, 87, 88, 89, 90, 94, 95, 97, 98, and 99 are not shown in FIG. 3.

In order to efficiently monitor performance of wind park 82, accurate determination of wind direction is important along with accurate determination of wind speed. Wind direction may be determined using measurement instruments such as a meteorological mast ("met mast"). However, given the size of many wind parks 82, the varying topography of many wind parks 82, and the cost of measurement instruments, suitable measurement instruments may not be available to provide an independent determination of wind direction. As a result, nacelle-position may be a useful value for determining wind direction.

At time of commission, wind turbines 80 are assigned a nacelle-position indicating the orientation of each wind turbine 80. As a result, the initial orientation of each wind turbine 80 (based on nacelle-position) may be used to determine wind direction during turbine operation since the wind turbine will yaw so that the rotor plane is perpendicular to the incoming wind direction. For example, if wind turbine 84 is known to be oriented in an eastward facing direction, performance output from wind turbine 84 may be used to determine wind direction at a point in time.

However, nacelle-position is not always reliable. Although in some known wind turbines 80, nacelle-position may not be initially assigned correctly, nacelle-position will also often deviate from the initially assigned orientation. In one example, maintenance and servicing events may cause the nacelle-position to be reported incorrectly.

FIG. 3 also illustrates that in a particular wind park 82, wind turbines 80 may be in spatial relationships with multiple wind turbines. For example, wind turbines 89, 94, and 99 are all on a left-right axis with one another. We may assume that wind turbines 89, 94, and 99 all have the same reported nacelle-position value indicating that all are westward facing. Assuming that such reported nacelle-positions are accurate, when wind blows from west to east, wind turbines 94 and 99 are downstream of wind turbine 89. Conversely, when wind blows from east to west, wind turbines 94 and 89 are downstream of wind turbine 99. As a result, if reported nacelle-positions are accurate, it would be predicted that when wind blows from west to east, wind turbine 94 and 99 should have a comparatively low power production in comparison to wind turbine 89 due to wake effects 70 caused by wind turbine 89 on wind turbines 94 and 99.

As described herein, the systems and methods are configured to predict expected wake features for wind turbines 80 that are spatially related and have similar physical orientations (i.e., wind turbines 80 are actually oriented in the same direction). Wake features represent the relationship of production data for wind turbines 80 that are expected to have wake effects 70 on one another. For example, wake features may include a predicted peak in a ratio of production when a large wake effect 70 is expected and a predicted trough when wind blows in the reverse direction. Such prediction may be made based on modeling, described below. The systems and methods further compare such predicted wake features to current wake features (based on performance data or historical performance data). When a variance exists between predicted wake features and current wake features, the system may determine that one of the wind turbines 80 has an imprecisely calibrated nacelle-position. For example, the system may predict that, during a westward directed wind, wind turbine 94 would have a significantly lower production output than wind turbine 99 and during a southward directed wind, wind turbine 94 would have a similar production output to wind turbine 99. If production data fails to support such predicted wake features, wind turbine 94 or wind turbine 99 may be reporting an improperly calibrated nacelle-position. Accordingly, each wind turbine 80 may have a nacelle-position recalibrated. In the exemplary embodiment, such recalibration occurs serially. For example, a particular wind turbine 80 is grouped neighboring wind turbines and comparisons between predicted wake features and current wake features are obtained in order to identify a recalibration factor for particular wind turbine 80. Upon recalibration, each neighboring wind turbine may be recalibrated in a serial fashion.

The systems and methods described herein perform such analysis by designating groups of wind turbines 91. In FIG. 3, an exemplary group of wind turbines 91 includes wind turbine 97 and 98. We may assume that both wind turbine 97 and wind turbine 98 report a nacelle-position value of 140° relative to the positive y-axis. When wind direction is first wind direction 92 (representing a wind direction of 140° relative to the positive y-axis or a northwestern wind direction), wind turbine 98 is downstream of wind turbine 97. When wind direction is second wind direction 93 (representing a wind direction of 320° relative to the positive y-axis or a southeastern wind direction), wind turbine 98 is upstream of wind turbine 97. As described herein, the systems and methods are configured to select groups of wind turbines 80 and compare associated performance data to identify whether nacelle-position is properly calibrated for the wind turbines of the grouping of wind turbines. Selecting group of wind turbines 91 in a spatial relationship with one another is important to facilitate the comparison of performance data. Accordingly, for the pair of wind turbines 97 and 98, significant peaks and troughs (wake features, as described below) would be expected when comparing performance data with the wake features being most notable at first wind direction 92 and second wind direction 93. As described herein, additional considerations may inform the pairing or grouping of wind turbines 80. For example, if wind turbines 80 are not substantially proximate to one another, they may be unsuitable for identification in group of wind turbines 91 because impediments such as hills or other obstructions may diminish any meaningful relationships and wake effects 70.

The systems and methods are configured to identify or receive groups of wind turbines 91. Based on such groupings, performance data associated with wind turbines 80 of groups of wind turbines 91 may be compared to modeled data to determine whether nacelle-position is properly calibrated for associated wind turbines 80.

Figure 4:
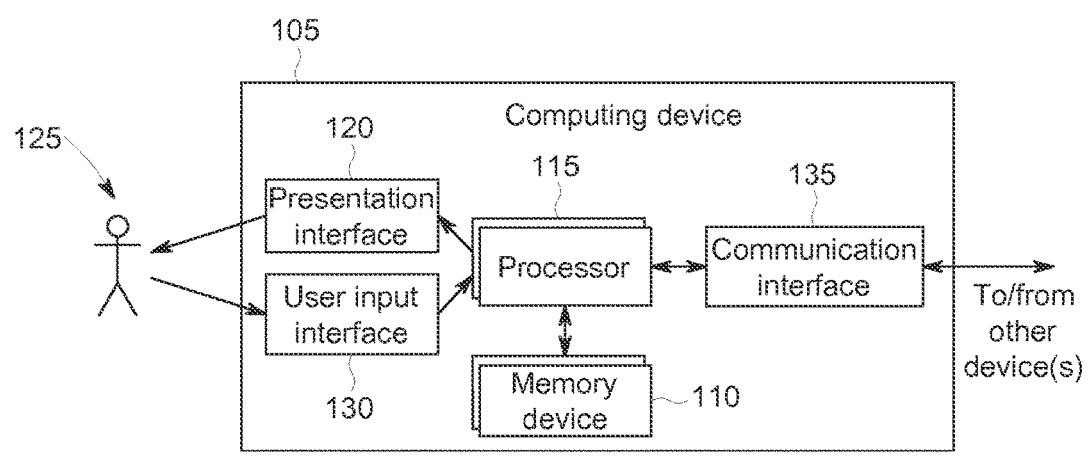
FIG. 4 is a block diagram of an exemplary computing device that may be used for monitoring and recalibrating nacelle-positions of a plurality of wind turbines in a wind park.

FIG. 4 is a block diagram of an exemplary computing device 105 that may be used for monitoring and recalibrating nacelle-positions of a plurality of wind turbines in a wind park. Computing device 105 includes a memory device 110 and a processor 115 operatively coupled to memory device 110 for executing instructions. In the exemplary embodiment, computing device 105 includes a single processor 115 and a single memory device 110. In alternative embodiments, computing device 105 may include a plurality of processors 115 and/or a plurality of memory devices 110. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110.

In the exemplary embodiment, memory device 110 is one or more devices that enable storage and retrieval of information such as executable instructions and/or other data. Memory device 110 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Memory device 110 may be configured to store operational data including, without limitation, wind turbine clustering algorithms, wind turbine pairing algorithms, wind turbine output modeling algorithms, historical wind turbine performance data, current wind turbine performance data, and other information related to wind turbines in wind park 82 (shown in FIG. 3) such as maintenance and service data. In some embodiments, processor 115 removes or "purges" data from memory device 110 based on the age of the data. For example, processor 115 may overwrite previously recorded and stored data associated with a subsequent time and/or event. In addition, or alternatively, processor 115 may remove data that exceeds a predetermined time interval. Also, memory device 110 includes, without limitation, sufficient data, algorithms, and commands to facilitate operation of the computer-implemented system (not shown in FIG. 4). For example, memory device 110 includes data, algorithms, and commands to facilitate the wake model calculations and predictions as described herein.

In some embodiments, computing device 105 includes a user input interface 130. In the exemplary embodiment, user input interface 130 is coupled to processor 115 and receives input from user 125. User input interface 130 may include, without limitation, a keyboard, a pointing device, a mouse, a stylus, a touch sensitive panel, including, e.g., without limitation, a touch pad or a touch screen, and/or an audio input interface, including, e.g., without limitation, a microphone. A single component, such as a touch screen, may function as both a display device of presentation interface 120 and user input interface 130.

A communication interface 135 is coupled to processor 115 and is configured to be coupled in communication with one or more other devices, such as a sensor or another computing device 105, and to perform input and output operations with respect to such devices. For example, communication interface 135 may include, without limitation, a wired network adapter, a wireless network adapter, a mobile telecommunications adapter, a serial communication adapter, and/or a parallel communication adapter. Communication interface 135 may receive data from and/or transmit data to one or more remote devices. For example, a communication interface 135 of one computing device 105 may transmit an alarm to communication interface 135 of another computing device 105. Communications interface 135 facilitates machine-to-machine communications, i.e., acts as a machine-to-machine interface. Communications interface 135 is also configured to communicate with wind turbines 10 (shown in FIG. 1) in wind parks 82 (shown in FIG. 2). As a result, computing device 105 is configured to receive data from wind turbines 10 including but not limited to reported nacelle-positions, current production data, historical production data, location data for wind turbines 10, and maintenance and service records for wind turbines 10.

Presentation interface 120 and/or communication interface 135 are both capable of providing information suitable for use with the methods described herein, e.g., to user 125 or another device. Accordingly, presentation interface 120 and communication interface 135 may be referred to as output devices. Similarly, user input interface 130 and communication interface 135 are capable of receiving information suitable for use with the methods described herein and may be referred to as input devices. In the exemplary embodiment, presentation interface 120 is used to visualize the data including, without limitation, location plots of wind turbines 10 such as shown in FIG. 3, nacelle-position orientation for wind turbines 10, wake features including production ratios for grouped wind turbines 91 (shown in FIG. 3), and other visual information including radar plots showing production ratios for grouped wind turbines 91. Once such data is visualized user 125 may use user input interface 130 to execute tasks including, without limitation, recalibration of nacelle-positions, regrouping of wind turbines 10, and any other relevant tasks. Such tasks may include the use of additional software which may facilitate such functions.

In the exemplary embodiment, computing device 105 is an exemplary embodiment of a computing device to be used in an exemplary high-level computer-implemented system for recalibrating and monitoring nacelle-positions of a plurality of wind turbines in a wind park (not shown in FIG. 4). In at least some other embodiments, computing device 105 is also an exemplary embodiment of other devices (not shown in FIG. 4) and other devices (not shown) used for recalibrating and monitoring nacelle-positions. In most embodiments, computing device 105 at least illustrates the primary design of such other devices.

Figure 5:
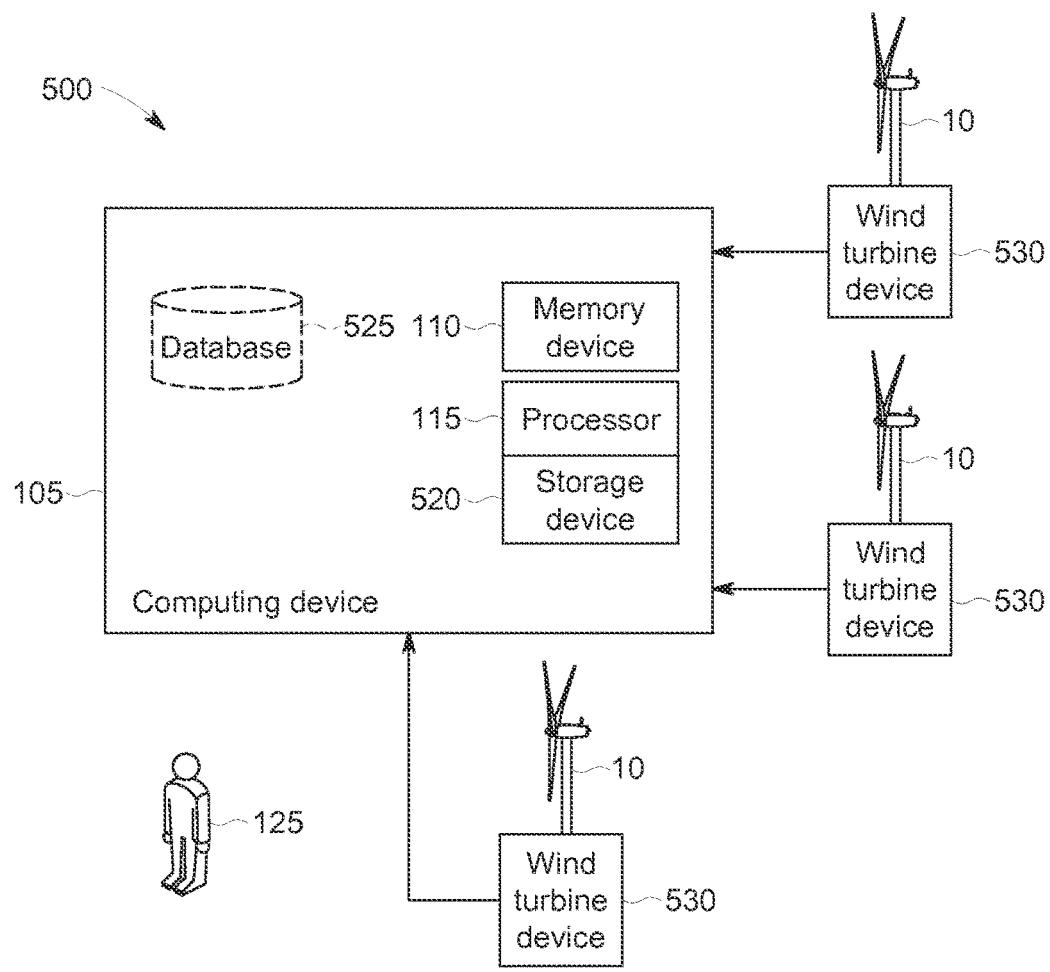
FIG. 5 is a schematic view of an exemplary high-level computer-implemented system for monitoring and recalibrating nacelle-positions that may be used with the computing device shown in FIG. 4.

FIG. 5 is a schematic view of an exemplary high-level computer-implemented system 500 for monitoring and recalibrating nacelle-positions that may be used with computing device 105 (shown in FIG. 4). System 500 includes computing device 105 in communication with a plurality of wind turbine devices 530 associated with wind turbines 10. Wind turbine devices 530 may represent simple computing devices capable of providing reporting and monitoring functions. Wind turbine devices 530 may also be pooled such that a particular wind turbine device 530 may report on a plurality of wind turbines 10. Computing device 105 includes memory device 110 coupled to processor 115. In at least some embodiments, computing device 105 also includes storage device 520 which is coupled to processor 115 and memory device 110. Storage device 520 represents a device supplemental to memory device 110 that may store information related to the methods and systems described herein. Storage device 520 may be directly accessible by processor 115 of computing device 105 or may alternately be accessible via communication interface 135.

In at least some embodiments, computing device 105 includes database 525. Database 525 may be any organized structure capable of representing information related to the methods and systems described including, without limitation, models used to predict wind turbine outputs, models used to predict wind turbine wake features, data regarding wind turbine locations, data regarding wind turbine nacelle-position orientation, and historic and current wind turbine production data.

In at least some embodiments, user 125 interacts with computing device 105 in order to facilitate recalibrating and monitoring nacelle-positions of wind turbines in a wind park using the systems and methods described. User 125 may interact using presentation interface 120 (shown in FIG. 1) and user input interface 130 (shown in FIG. 1).

Figure 6:
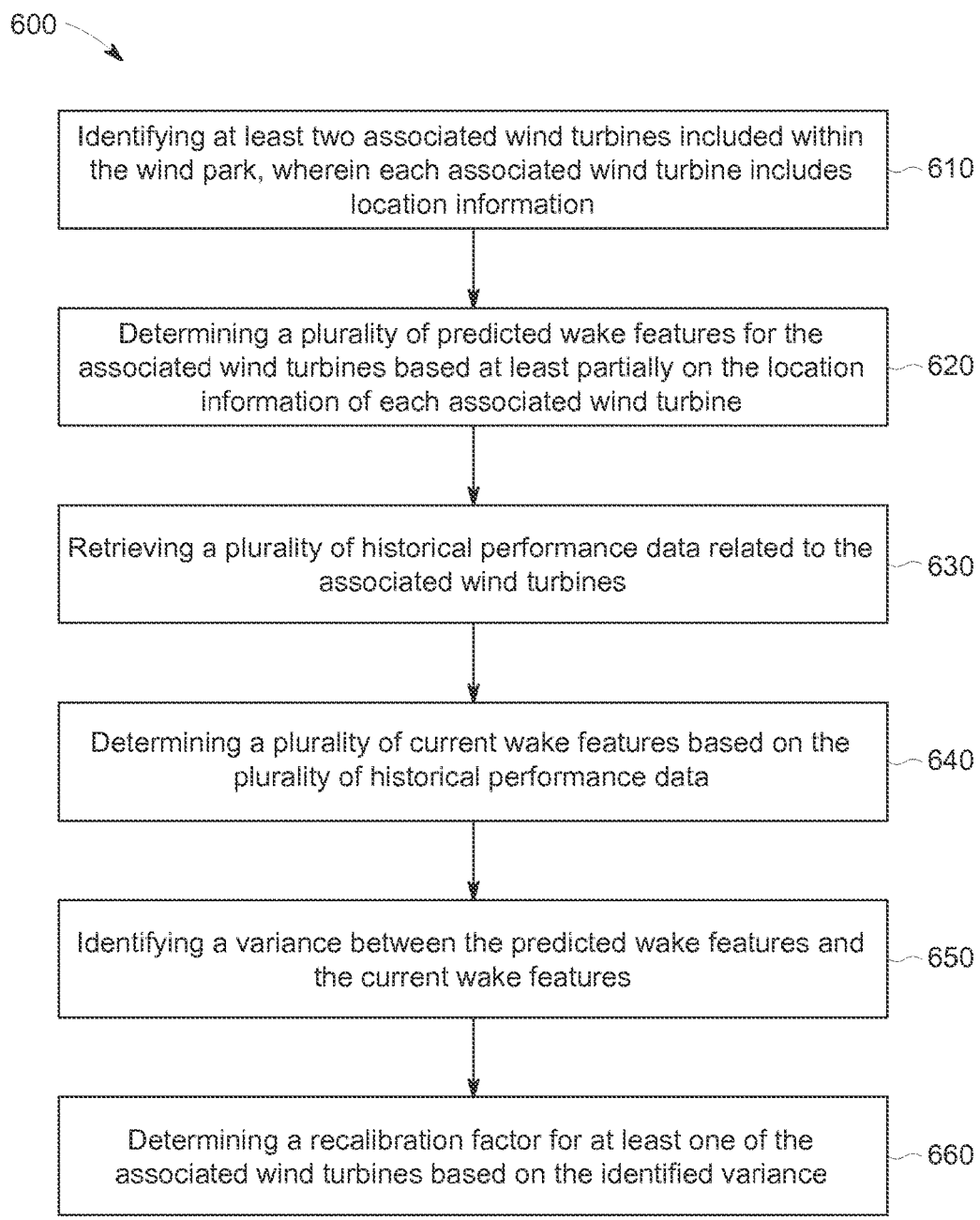
FIG. 6 is a flow chart of an exemplary process for recalibrating nacelle-positions using the computer-implemented system shown in FIG. 5.

FIG. 6 is a flow chart of an exemplary process 600 for recalibrating nacelle-positions using computer-implemented system 500 (shown in FIG. 5). Process 600 is implemented by nacelle calibration computing device 105 (shown in FIG. 4). Nacelle calibration computing device 105 identifies 610 at least two associated wind turbines included within the wind park, wherein each associated wind turbine includes location information. Identifying 610 represents selecting at least two wind turbines 80 as being part of a group of wind turbines 91 (both shown in FIG. 3). Identifying 610 may be accomplished using a plurality of exemplary methods. In a first exemplary method, nacelle calibration computing device 105 applies a turbine clustering algorithm to the wind park to define a plurality of turbine groupings 91. Each turbine grouping 91 of the plurality of turbine groupings 91 includes a plurality of wind turbines 80 and a relationship weighting value representing a proximity between the plurality of grouped wind turbines within the turbine groupings. More specifically, the relationship weighting value may be determined based on the distance between wind turbines 80 in group of wind turbines 91. In at least some examples, group of wind turbines 91 may also be evaluated depending on whether wind turbines 80 are within line-of-sight of one another. If, for example, obstructions or great distances exist between wind turbines 80, the relationship weighting may be reduced because in such examples wake effects may be lower. In alternative examples, the turbine clustering algorithm may identify turbine groupings 91 wherein wind turbines 80 are at absolute or relative edges within wind park 82 (shown in FIG. 3). For example, if a cluster of three wind turbines A, B, C, and D are proximate to one another in a sequential row with no other wind turbines in the same axial relationship in relative proximity, wind turbines A and D may be identified as "edge turbines."

Turbine groupings 91 are ranked based at least in part on relationship weightings. Nacelle calibration computing device 105 processes all potential turbine groupings 91 and determines a preferred list of turbine groupings 91 that have the highest total relationship weightings.

Nacelle calibration computing device 105 also determines 620 a plurality of predicted wake features for the associated wind turbines based at least partially on the location information of each associated wind turbine. Determining 620 represents determining wake features based on site layout. Determining 620 involves identifying potential wake effects 70 (shown in FIG. 2) between wind turbines 80 and using such wake effects 70 to determine wake features. In the exemplary embodiment, a generic wind speed is identified by nacelle calibration computing device 105 as a baseline speed for determining 620. For example, the baseline speed may be 10 meters per second in one example. Nacelle calibration computing device 105 projects a complete rotation of wind based on the baseline speed. In other words, wind is projected across the full 360° range of rotation over a standardized interval. In one example, wind is projected at 10 meters per second over 360 regular 1° intervals. Based on the 360 distinct projections of wind direction, nacelle calibration computing device 105 determines 620 a plurality of wake features based on the site layout.

In an alternative embodiment, a wind park simulation model is performed on all wind turbines 80 in wind park 82 based on location information and nacelle-position information for each wind turbine 80. The wind park simulation model receives at least two inputs. First, a vector baseline $V_{baseline}$ is received. $V_{baseline}$ represents free stream wind speeds vectors associated with given dates and times. Although $V_{baseline}$ does not precisely estimate the wind speed at wind park 82, it provides a substantially strong proxy value for calibration. Second, a wind direction estimate d is input into the wind park simulation model. The wind direction estimate is derived using a $V_{baseline}$ representing an actual nacelle-position value for a baseline turbine and a $\theta_{baseline}$ value representing an estimated offset of the $V_{baseline}$ position. The $V_{baseline}$ is associated with date and time information and may thus be integrated. $V_{baseline}$ and $\theta_{baseline}$ are used to calculate d.

In the exemplary embodiment, nacelle calibration computing device 105 determines 620 wake features for each wind turbine grouping 91 in wind park 82 at multiple timepoints. In the exemplary embodiment, such wake features represent power output ratios for wind turbines 80 in wind turbine groupings 91. In other embodiments, other wake features may be determined. As described below, wake features determined 620 are compared to current or actual wake features based on current or historic production data and errors are identified.

Referring to FIG. 6, nacelle calibration computing device 105 also retrieves 630 a plurality of historical performance data related to the associated wind turbines. Retrieving 630, in one embodiment, represents nacelle calibration computing device 105 receiving information from wind turbine devices 530 (shown in FIG. 5) representing historical performance data for wind turbines 80. In the exemplary embodiment, historical performance data represents historic power output for wind turbines 80.

In at least some examples, the plurality of historical performance data retrieved 630 is associated with a reported nacelle-position value with a systemic error or a zero-error. More specifically, reported nacelle-position values may indicate that a difference between reported nacelle-position values for two wind turbines 80 has changed in a significant manner (e.g., a step-feature). In other words, previously reported nacelle-position values may indicate that two wind turbines 80 have a particular relationship (e.g., wind turbines 80 are parallel with one another) until time $t_0$ while at time $t_1$, reported nacelle-position data indicates that wind turbines 80 have a different relationship. Such a change or step-feature may be identified by a significant and sudden change in the difference between reported nacelle-position values over a short time interval. In at least one embodiment, the differential between reported nacelle-position values for a pair of turbines (or a group of turbines) may be identified by monitoring for the detection of such a change or step-feature. Such monitoring may be done in an online manner (i.e., continuous readings and detection of a step-change in present time) or in an offline manner (i.e., review of historic readings of nacelle-position values and detection of step-change based upon such historic readings.) In such examples, the plurality of historical performance data may be adjusted for all relevant wind turbines 80 to remediate the impact of the step-feature. Alternately, the presence of the step-feature may be used to identify a recalibration factor for at least one of relevant wind turbines 80. In at least some examples, the step feature may accurately indicate a change in the relationship between wind turbines 80. In at least some examples, nacelle calibration computing device 105 may trigger an alert to a technician or engineer to verify the relationship between wind turbines 80.

Nacelle calibration computing device 105 further determines 640 a plurality of current wake features based on the plurality of historical performance data. Determining 640 represents identifying wake features between wind turbines 80 in wind turbine groupings 91 based at least in part on the plurality of historical performance data previously retrieved 630. In the exemplary embodiment, determining 640 represents calculating power output ratios for wind turbines 80 in wind turbine groupings 91.

Referring again to FIG. 6, nacelle calibration computing device 105 additionally identifies 650 a variance between the predicted wake features and the current wake features. Identifying 650 represents comparing wake features determined in determining 620 and determining 640. In some examples, identifying 650 also includes determining a primary portion of the predicted wake features and the current wake features associated with a first variance level. The first variance level may be the most dominant wake feature between the group of wind turbines 91. More specifically, identifying 650 may include identifying a more significant portion (e.g., a larger feature, numerically) of predicted wake features and current wake features wherein the distinction between predicted wake features and current wake features is relatively high in comparison to a less significant portion of predicted wake features and current wake features wherein the distinction between predicted wake features and current wake features is relatively low. In such examples, the primary portion of the predicted wake features and the current wake features are compared to identify 650 a variance. The primary portion may be used to identify a primary distinction and therefore to determine a recalibration factor.

Nacelle calibration computing device 105 also determines 660 a recalibration factor for at least one of the associated wind turbines based on the identified variance. Determining 660 represents identifying the degree to which current wake features vary from predicted wake features. In examples where a primary portion of the predicted wake features and current wake features is identified, only the primary portion may be used to determine 660 recalibration factor. In some further examples, the secondary portion of the predicted wake features and current wake features may be used to adjust the determined 660 recalibration factor. The secondary portion may be used to identify a secondary distinction and therefore to adjust the recalibration factor.

In one example, the recalibration factor determined 660 for wind turbines 80 may be used to adjust and correct current performance data. For example, nacelle calibration computing device 105 may receive a plurality of current performance data associated with the associated wind turbines, apply the recalibration factor to the received current performance data to correct current performance data and create a set of adjusted current performance data. Such correction may alternately be made on real-time data and historical data. Therefore, all performance data may be corrected.

Further, in at least one example, adjusted (or corrected) performance data may be compared to uncorrected performance data. Such a variation may be used to determine present and past inaccuracies in output reporting at the wind park.

Figure 7:
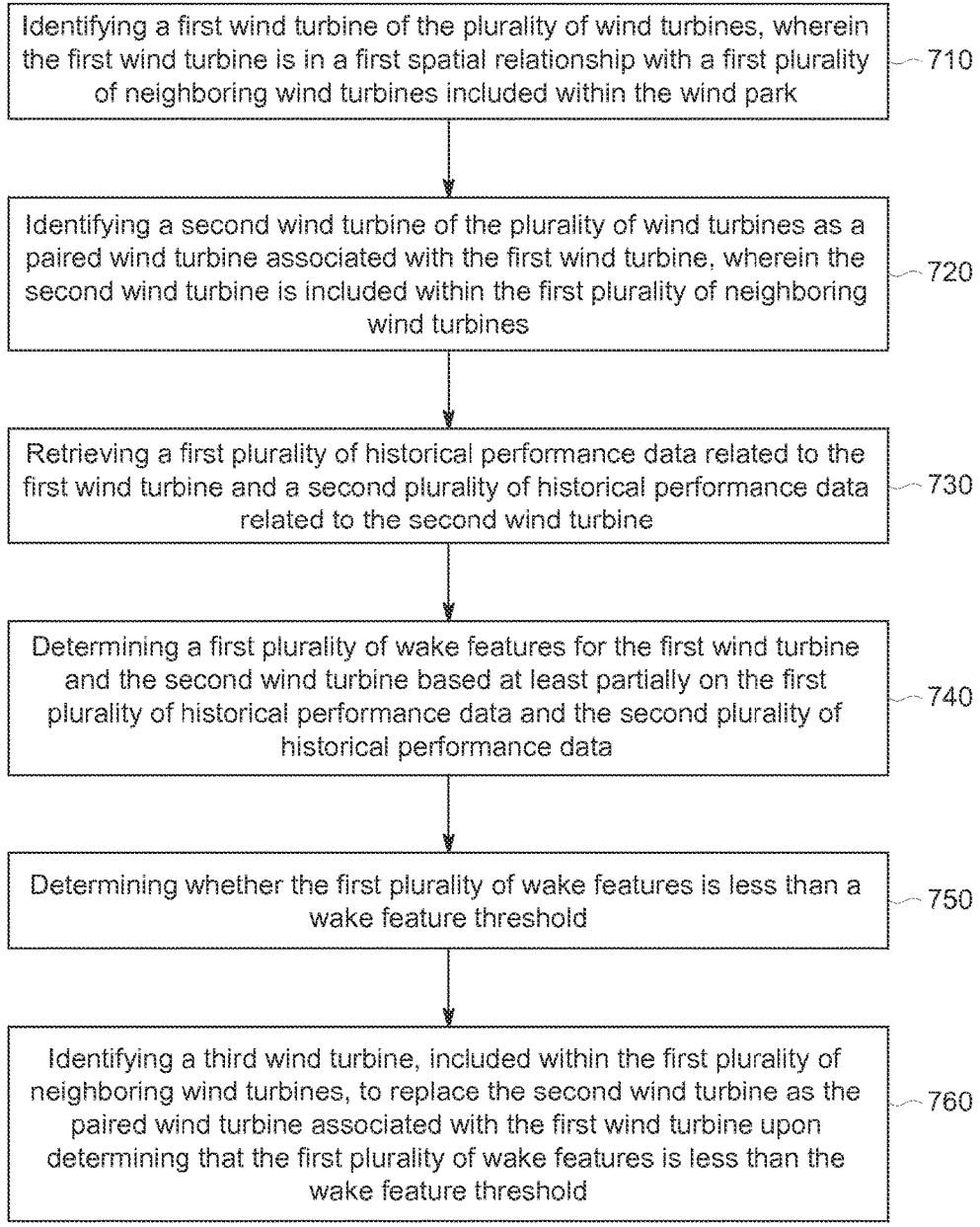
FIG. 7 is a flow chart of an alternative process for recalibrating nacelle-positions using the computer-implemented system shown in FIG. 5.

FIG. 7 is a flow chart of an alternative process 700 for recalibrating nacelle-positions using computer-implemented system 500 (shown in FIG. 5). Process 700 is implemented by nacelle calibration computing device 105. Process 700 substantially facilitates identifying preferred groupings of wind turbines 91 (shown in FIG. 3). Nacelle calibration computing device 105 identifies 710 a first wind turbine of the plurality of wind turbines, wherein the first wind turbine is in a first spatial relationship with a first plurality of neighboring wind turbines included within the wind park. Identifying 710 represents selecting a wind turbine 80 (shown in FIG. 3) from wind park 82 (shown in FIG. 3).

Nacelle calibration computing device 105 also identifies 720 a second wind turbine of the plurality of wind turbines as a paired wind turbine associated with the first wind turbine, wherein the second wind turbine is included within the first plurality of neighboring wind turbines. Identifying 720 represents selecting a wind turbine for a wind turbine group 91 (shown in FIG. 3) using similar techniques to those referred to in identifying 610 (shown in FIG. 6). In the exemplary embodiment, plurality of neighboring wind turbines are wind turbines 80 that are in an axial relationship with one another. In further embodiments, the plurality of neighboring wind turbines are wind turbines that are in line-of-sight with one another. In other words, no geographic or physical obstacles exist between the plurality of neighboring wind turbines other than wind turbines themselves. As used herein, "line-of-sight" therefore refers to the idea that two wind turbines have no physical obstacles between each other beyond other wind turbines.

Nacelle calibration computing device 105 further retrieves 730 a first plurality of historical performance data related to the first wind turbine and a second plurality of historical performance data related to the second wind turbine. In the exemplary embodiment, retrieving 730 represents retrieving power output data related for first wind turbine and second wind turbine.

Nacelle calibration computing device 105 additionally determines 740 a first plurality of wake features for the first wind turbine and the second wind turbine based at least partially on the first plurality of historical performance data and the second plurality of historical performance data. In the exemplary embodiment, determining 740 represents determining at least one power output ratio between the first wind turbine and the second wind turbine that may be used to describe the first plurality of wake features.

Nacelle calibration computing device 105 additionally determines 750 whether the first plurality of wake features is less than a wake feature threshold. In the exemplary embodiment, determining 750 represents determining whether power output ratios based on measured performance data exceed or fall below a predetermined wake feature threshold. The predetermined wake feature threshold may be determined based on programmatic or human input. The predetermined wake feature threshold substantially represents a minimum level of wake feature distinction required for a group of wind turbines 91. The predetermined wake feature threshold may substantially be created based on location characteristics associated with the first wind turbine and the second wind turbine.

In at least some examples, predetermined wake feature threshold may be set relative to a baseline. As described below, polar plots 800, 900, 1000, and 1100 include unit circles 820 and 1020 (all shown in FIGS. 8-11) indicating a baseline where a power ratio between wind turbines is equal to 1.0 (i.e., the power output for the wind turbines is the same). In some examples, the predetermined wake feature threshold may be required to be a multiplier of such unit circles 820 and 1020. Further, in other examples, the predetermined wake feature threshold may be required to be larger than a "next largest wake feature" by a certain amount or larger than an average wake feature by a certain amount.

Nacelle calibration computing device 105 further identifies 760 a third wind turbine included within the first plurality of neighboring wind turbines, to replace the second wind turbine as the paired wind turbine associated with the first wind turbine upon determining that the first plurality of wake features is less than the wake feature threshold. Nacelle calibration computing device 105 identifies 760 in order to identify a preferable group of wind turbines 91 upon determining that the initial group of wind turbines 91 was not associated with sufficient wake features in comparison to a wake feature threshold. In one example identifying 760 includes selecting as the third wind turbine a turbine that is most proximate the first wind turbine from the first plurality of neighboring wind turbines excluding the second wind turbine. In a second example, identifying 760 includes selecting as the third wind turbine a turbine that is located at an edge of the first plurality of neighboring wind turbines. In a third example, identifying 760 includes selecting as the third wind turbine a turbine that is aligned axially with the first turbine and one or more neighboring turbines, although other turbines may be positioned between the first and third turbines. In a third example, identifying 760 includes selecting as the third wind turbine a turbine that has specific spatial characteristics. For example, the third wind turbine may be selected by "leap frogging" over previously identified second wind turbines or by finding an "edge turbine" wherein the third turbine is at an edge of the group of neighboring turbines.

In at least some examples, the new group of wind turbines 91 including the selected third wind turbine is similarly tested. More specifically, the nacelle calibration computing device 105 also retrieves a third plurality of historical performance data related to the first wind turbine and a fourth plurality of historical performance data related to the third wind turbine, determines a second plurality of wake features for the first wind turbine and the third wind turbine based at least partially on the third plurality of historical performance data and the fourth plurality of historical performance data, determines whether the second plurality of wake features is less than a wake feature threshold, and identifies a fourth wind turbine, included within the first plurality of neighboring wind turbines, to replace the third wind turbine as the paired wind turbine associated with the first wind turbine upon determining that the second plurality of wake features is less than the wake feature threshold.

In an alternative embodiment, the wake feature threshold may be computed after recalibration factors are determined for a group of wind turbines 91 using the method described in FIG. 6. In this embodiment, the recalibrated wind direction readings of each turbine 80 is compared with those of every other turbine 80 in wind park 82. If the recalibrated readings of a particular turbine 80 disagree to a large extent with a majority of turbines 80 in wind park 82, it can be concluded that the recalibration factor for particular turbine 80 with disagreement has been computed incorrectly.

Figure 10:
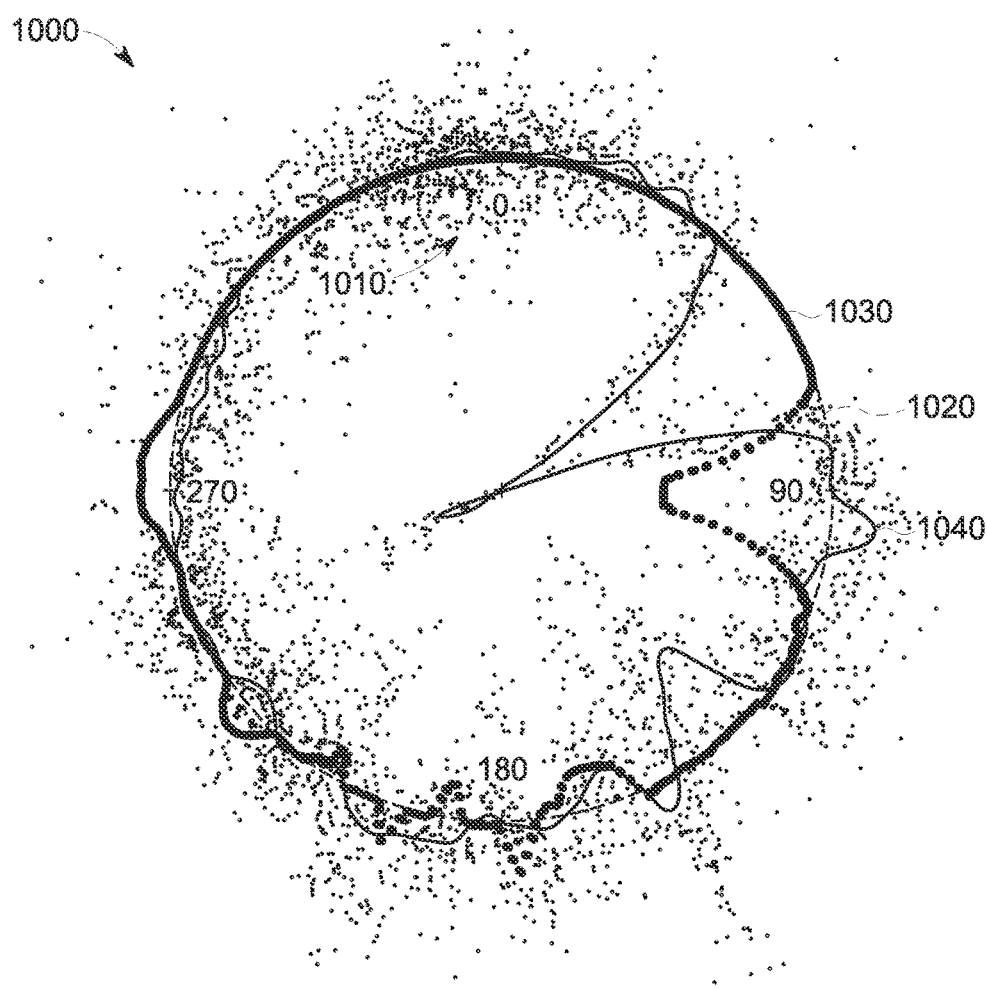
FIG. 10 is a third polar plot indicating a comparison between predicted wake features and current wake features for a second pair of wind turbines.
Figure 11:
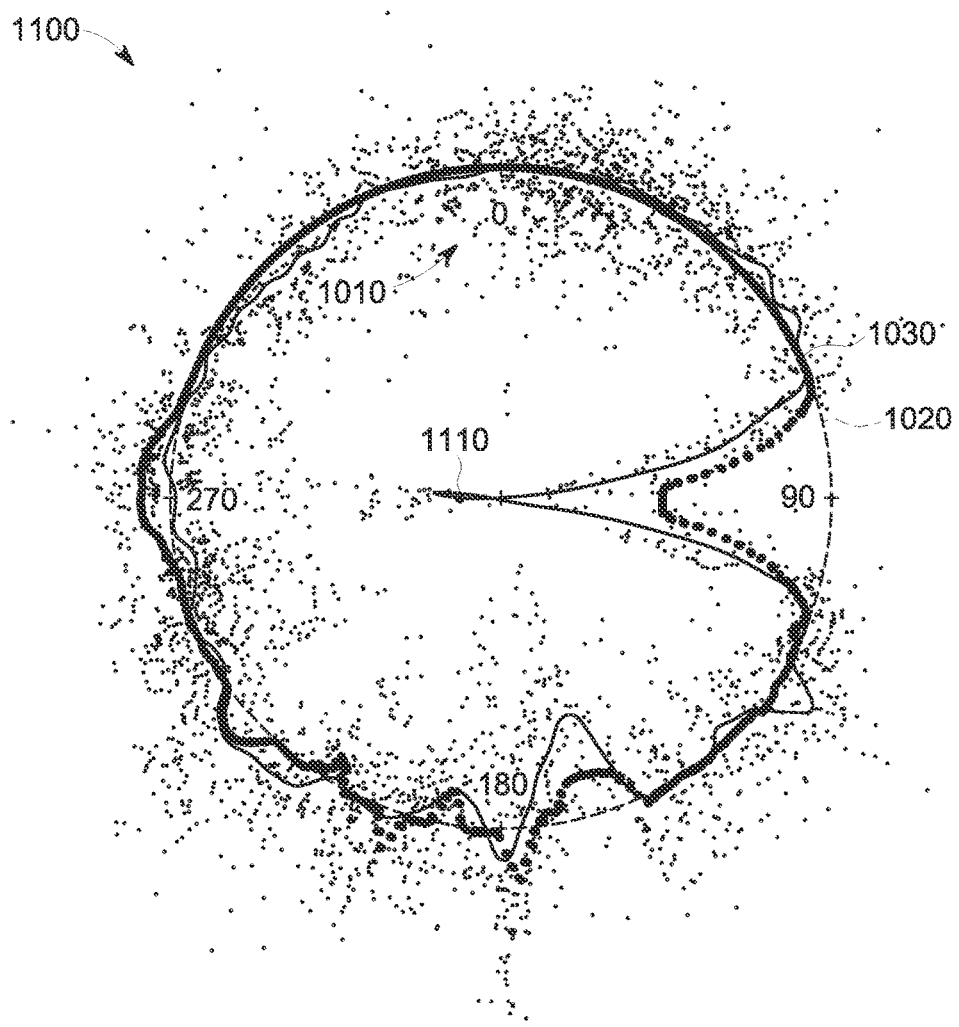
FIG. 11 is a fourth polar plot indicating a comparison between predicted wake features and recalibrated current wake features for the second pair of wind turbines of FIG. 10.

Referring now to FIGS. 10-11, FIG. 10 is a third polar plot 1000 indicating a comparison between predicted wake features 1030 and current wake features 1040 for a second pair of wind turbines while FIG. 11 is a fourth polar plot 1100 indicating a comparison between predicted wake features 1030 and recalibrated current wake features 1110 for the second pair of wind turbines of FIG. 10. Therefore, FIGS. 10 and 11 represent a comparison between predicted wake features 1030 and both current wake features 1040 and recalibrated wake features 1110 for the same pair of wind turbines. In FIGS. 10 and 11, second pair of wind turbines is a pair of wind turbines A and B (not shown) are identified 610 (shown in FIG. 6) and compared for the purpose of recalibrating nacelle-position values reported by wind turbine A.

In third polar plot 1000, scatter plot 1010 includes a plurality of data points indicating historical performance data. Current wake features 1040 are determined 640 (shown in FIG. 6) based on scatter plot 1010 representing historical performance data that is retrieved 630 (shown in FIG. 6). More specifically, current wake features 1040 are determined 640 by calculating a moving median for scatter plot 1010 across 360° indicated in third polar plot 1000. Predicted wake features 1030 are determined 620 (shown in FIG. 6) based at least partially on location information associated with each wind turbine of the second pair of wind turbines. Unit circle 1020 is indicated to assist in comparison. When any of predicted wake features 1030 or current wake features 1040 intersect or overlap with unit circle 1020, a power ratio of 1.0 is indicated. When predicted wake features 1030 or current wake features 1040 extend outside of unit circle 1020, a power ratio greater than 1.0 is indicated. When predicted wake features 1030 or current wake features 1040 are within unit circle 1020, a power ratio less than 1.0 is indicated.

More specifically, polar plot 1000 indicates that predicted wake features 1030 and current wake features 1040 do not substantially overlap in at least some feature areas. For instance, features of predicted wake features 1030 indicated at 90° and 270° are not matched with similar features of current wake features 1040 at those points in the plot while a substantial feature of current wake features 1040 at roughly 70° does not match with similar predicted wake features 1030. Accordingly, as described herein, nacelle calibration computing device 105 may identify 650 (shown in FIG. 6) a variance between predicted wake features 1030 and current wake features 1040 based on data indicated in third polar plot 1000. Thus, nacelle calibration computing device 105 determines 660 (shown in FIG. 6) a recalibration factor for at least one of the associated wind turbines (i.e. wind turbines A and B) based on the identified variance.

FIG. 11 indicates fourth polar plot 1100 indicating a comparison between predicted wake features 1030 (identical to those of third polar plot 1000 shown in FIG. 10) and recalibrated current wake features 1110 (representing current wake features 1040 of FIG. 10 recalibrated based on identified 650 variance as indicated in FIG. 10). As the substantial feature of current wake feature 1040 indicated at roughly 70° has adjusted to roughly 90° in fourth polar plot 1100, the recalibration factor is indicated to be roughly 20° clockwise. Polar plots 1000 and 1100 are provided for illustrative purposes. As described herein, nacelle calibration computing device 105 may use any comparable methods and any comparable data to implement the methods and systems described herein. As such, data such as historical performance data, predicted wake features, current wake features, and identified variance may be provided and indicated in alternative manners other than polar plots 1000 and 1100 including, for example, graphs of power-output ratios.

Figure 8:
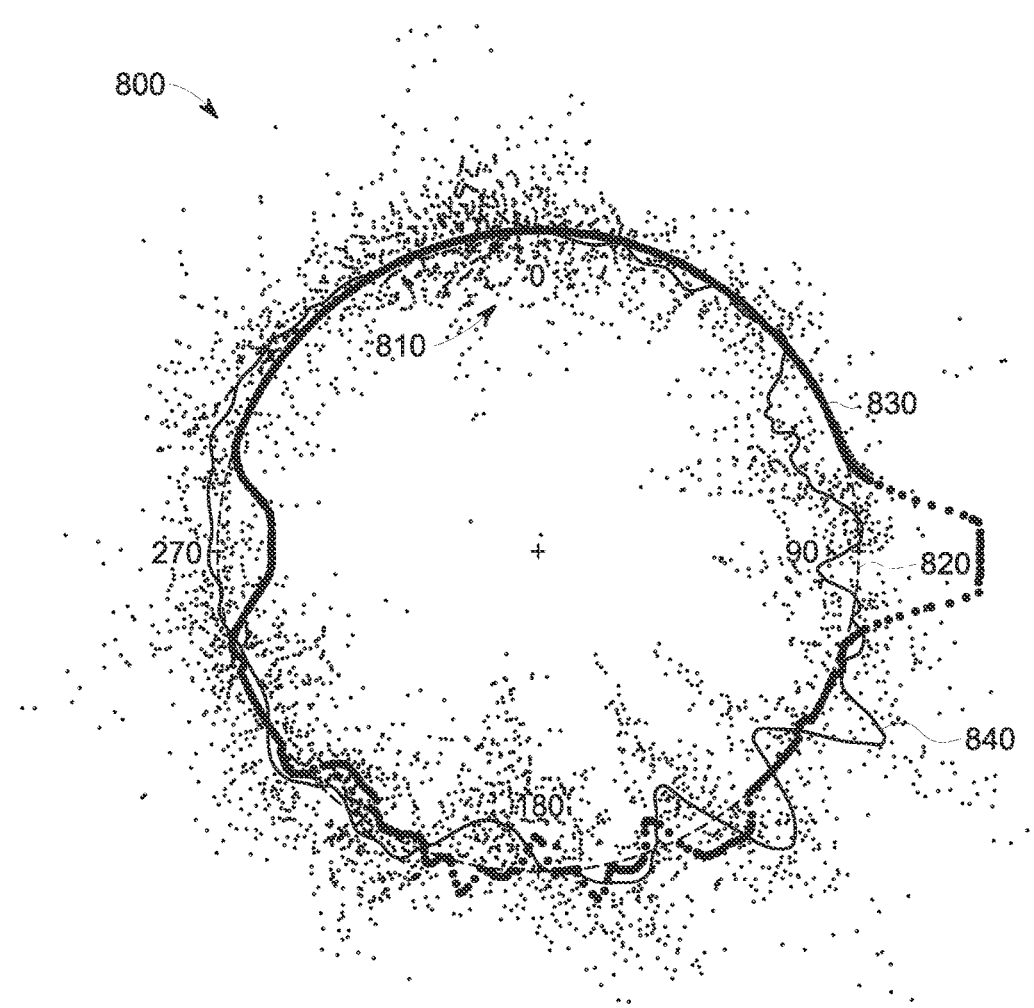
FIG. 8 is a first polar plot indicating a comparison between predicted wake features and current wake features for a first pair of wind turbines.
Figure 9:
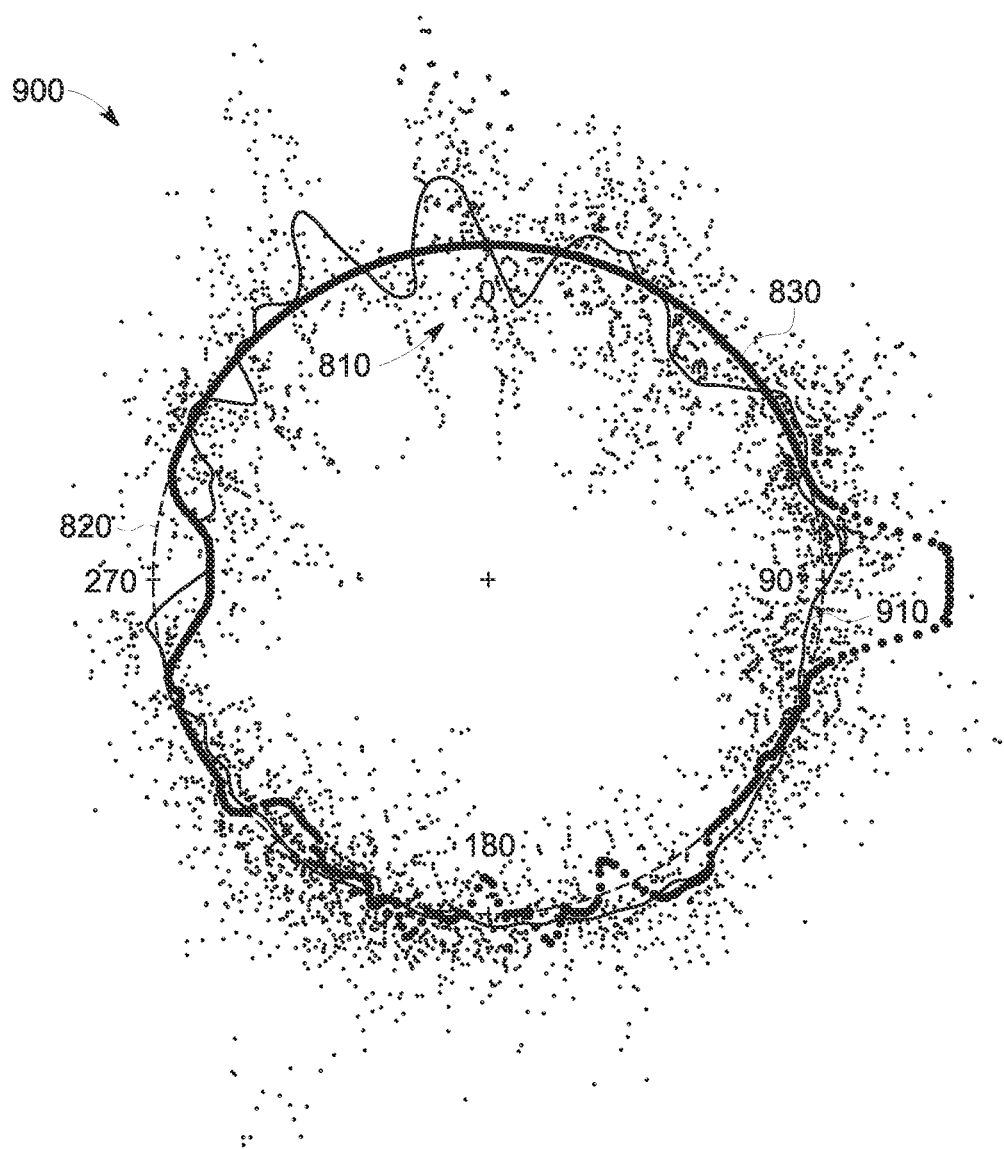
FIG. 9 is a second polar plot indicating a comparison between predicted wake features and recalibrated current wake features for the first pair of wind turbines of FIG. 8.

FIG. 8 is a first polar plot 800 indicating a comparison between predicted wake features 830 and current wake features 840 for a first pair of wind turbines A and C (not shown). As in FIG. 10, variance between predicted wake features 830 and current wake features 840 are identified 650 (shown in FIG. 6). As in FIG. 10, current wake features 840 are determined by calculating a moving median for scatter plot 810. Again, significant wake features are in predicted wake features 830 at roughly 90° and 270° while similar wake features are not present in current wake features 840 at the same locations. Accordingly, a recalibration factor is determined 660 based on identified variance and current wake features 840 may be recalibrated as indicated in FIG. 9. However, FIG. 9 indicates that such a recalibration may be insufficient. More specifically, FIG. 9, indicates that at roughly 90° and roughly 270°, recalibrated current wake features 910 do not include significant features.

In examples such as FIGS. 8 and 9, method 700 (shown in FIG. 7) may be implemented by nacelle calibration computing device 105 to determine that wind turbine pair A and C is not suitable for comparison to recalibrate wind turbine A. More specifically, wind turbine pair A and C are identified 710 and 720 (shown in FIG. 7), related historical performance data is retrieved 730 (shown in FIG. 7) to determine plurality of wake features 740 (shown in FIG. 7) such as current wake features 840, and nacelle calibration computing device 105 determines 750 whether current wake features 840 are less than a wake feature threshold (not shown). As indicated in FIG. 8, current wake features 840 lack any prominent feature that could be easily identified as corresponding to predicted wake features 830. As such, in at least one example, current wake features 840 are less than an associated wake feature threshold. In other words, nacelle calibration computing device may require that current wake features 840 substantially correspond to predicted wake features 830. In the example of FIGS. 8 and 9, nacelle calibration computing device 105 further identifies a third wind turbine (such as wind turbine B used in polar plots 1000 and 1100 in FIGS. 10 and 11) for comparison.

The above-described computer-implemented systems and methods provide an efficient approach for monitoring and recalibrating nacelle-positions of a plurality of wind turbines in a wind park. The systems and methods substantially improve the accuracy of nacelle-position reporting for wind turbines and resultantly improve the calculation of wind direction in the wind park. Further, by improving wind direction calculation, the systems and methods described facilitate improved monitoring and reporting of wind park performance and output.

An exemplary technical effect of the methods and computer-implemented systems described herein includes at least one of (a) improved accuracy of nacelle-position reporting; (b) improved determination of wind direction in wind parks; (c) enhanced reporting and monitoring of performance and output of wind parks; (d) wind direction-dependent control schemes; and (e) direction-dependent load curtailment and higher energy yield.

Exemplary embodiments for monitoring and recalibrating nacelle-positions of a plurality of wind turbines in a wind park are described above in detail. The computer-implemented systems and methods of operating such systems are not limited to the specific embodiments described herein, but rather, components of systems and/or steps of the methods may be utilized independently and separately from other components and/or steps described herein. For example, the methods may also be used in combination with other systems and environments and are not limited to the environments as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for recalibrating nacelle-positions of a plurality of wind turbines in a land-based wind park, said method implemented by a nacelle calibration computing device including a processor and a memory device coupled to the processor and a computer program tangibly embodied in a non-transitory computer readable medium, said method comprising:

identifying, using the nacelle calibration computing device, at least two associated wind turbines having similar physical orientations included within the land-based wind park, wherein each associated wind turbine includes location information;

determining, using the computer program of the nacelle calibration computing device, a plurality of predicted wake features for all wind turbines in the land-based wind park at multiple timepoints based at least partially on the location information of each associated wind turbine, wherein the predicted wake features are determined by identifying a generic wind speed as a baseline speed, and projecting a complete 360 degree of rotation of wind based on the baseline speed;

retrieving, using the nacelle calibration computing device, a plurality of historical performance data related to the associated wind turbines in the land-based wind park;

determining, using the nacelle calibration computing device, a plurality of current wake features for the associated wind turbines based in the land-based wind park at least partially on the plurality of historical performance data;

identifying, using the nacelle calibration computing device, a variance between the predicted wake features and the current wake features;

determining, using the nacelle calibration computing device, a recalibration factor for calibrating a nacelle-position of the at least one of the associated wind turbines in the land-based wind park based on the identified variance;

applying, using the nacelle calibration computing device, the recalibration factor to only the nacelle-position of at least one of the associated wind turbines in the land-based wind park to yield an adjusted nacelle-position;

controlling, using the nacelle calibration computing device, the at least one of the associated wind turbines in the land-based wind park based on the adjusted nacelle-position to minimize the identified variance between the predicted wake features and the current wake features; and applying, using the nacelle calibration computing device, wind direction-dependent control scheme, wherein the control scheme orients the at least one of the associated wind turbines in alignment with the wind direction determined in real-time based on the adjusted nacelle position in order to generate optimal power.

2. The method in accordance with claim 1, wherein identifying the at least two associated wind turbines comprises:
applying a wind turbine clustering algorithm to the wind park to define a plurality of wind turbine groupings, wherein each wind turbine grouping of the plurality of wind turbine groupings includes a plurality of wind turbines and a relationship weighting value representing a proximity between the plurality of grouped wind turbines within the wind turbine groupings;
ranking the wind turbine groupings based on the relationship weighting; and
identifying a plurality of preferred wind turbine groupings based on the ranked wind turbine groupings.

3. The method in accordance with claim 1 further comprising:
receiving a plurality of current performance data associated with the associated wind turbines; and
applying the recalibration factor to the received current performance data to generate a set of adjusted current performance data.

4. The method in accordance with claim 1 further comprising:
receiving a first nacelle-position value associated with a first wind turbine and a second nacelle-position value associated with a second wind turbine wherein the first nacelle-position value and the second nacelle-position value are associated with a first time period;
determining a first differential between the first nacelle-position value and the second nacelle-position value;
receiving a third nacelle-position value associated with the first wind turbine and a fourth nacelle-position value associated with the second wind turbine wherein the third nacelle-position value and the fourth-position value are associated with a second time period later than the first time period;
determining a second differential between the third nacelle-position value and the fourth nacelle-position value;
determining whether a step-feature is indicated by comparing the first differential and the second differential; and
transmitting a request for recalibration of at least one of the first wind turbine and the second wind turbine based on the determined step-feature.

5. The method of claim 1, wherein determining the predicted wake features further comprises:
identifying predicted wake effects associated with the associated wind turbines; and
determining a power ratio between two of the associated wind turbines based on the identified predicted wake effects.

6. A method of controlling a plurality of wind turbines in a land based wind park, the method comprising:
identifying, using a nacelle calibration computing device, at least two associated wind turbines having similar physical orientations included within the land-based wind park, wherein each associated wind turbine includes location information;
determining, using the computer program of the nacelle calibration computing device, a plurality of predicted wake features for the associated wind turbines based at least partially on the location information of each associated wind turbine in the land-based wind park;
retrieving, using the nacelle calibration computing device, a plurality of historical performance data related to the associated wind turbines;
determining, using the nacelle calibration computing device, a plurality of current wake features for the associated wind turbines in the land-based wind park based at least partially on the plurality of historical performance data;
identifying, using the nacelle calibration computing device, a variance between the predicted wake features and the current wake features;
determining, using the nacelle calibration computing device, a recalibration factor for calibrating a nacelle-position of the at least one of the associated wind turbines in the land-based wind park based on the identified variance;
applying, using the nacelle calibration computing device, the recalibration factor to only the nacelle-position of at least one of the associated wind turbines to yield an adjusted nacelle-position;
controlling, using the nacelle calibration computing device, the at least one of the associated wind turbines based on the adjusted nacelle-position to minimize the identified variance between the predicted wake features and the current wake features, thereby enhancing monitoring of performance of the land-based wind park;
wherein the controlling further comprises:
determining wind direction in real-time based on the adjusted nacelle-position, and
orienting the at least one of the associated wind turbines in alignment with the determined wind direction in order to generate optimal power.

* * * * *